US009778950B2

(12) United States Patent
Yu

(10) Patent No.: US 9,778,950 B2
(45) Date of Patent: Oct. 3, 2017

(54) THROTTLING CIRCUITRY

(71) Applicant: Apple Inc., Cupertino, CA (US)

(72) Inventor: Shu-Yi Yu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 336 days.

(21) Appl. No.: 14/532,630

(22) Filed: Nov. 4, 2014

(65) Prior Publication Data

US 2016/0124771 A1 May 5, 2016

(51) Int. Cl.

| | |
|---|---|
| ***G06F 1/32*** | (2006.01) |
| ***G06F 9/48*** | (2006.01) |
| ***G06F 13/24*** | (2006.01) |

(52) U.S. Cl.

CPC ............ *G06F 9/4825* (2013.01); *G06F 13/24* (2013.01)

(58) Field of Classification Search

None

See application file for complete search history.

(56) References Cited

U.S. PATENT DOCUMENTS

| | | | |
|---|---|---|---|
| 7,451,332 B2 | 11/2008 | Culbert et al. | |
| 8,156,362 B2 * | 4/2012 | Branover .............. | G06F 1/3203 710/262 |
| 8,799,696 B2 | 8/2014 | Gooding et al. | |
| 2014/0195708 A1 | 7/2014 | Klein et al. | |

* cited by examiner

*Primary Examiner* — Cheng-Yuan Tseng

(74) *Attorney, Agent, or Firm* — Meyertons, Hood, Kivlin, Kowert & Goetzel, P.C.

(57) ABSTRACT

Techniques are disclosed relating to processor power control and interrupts. In one embodiment, an apparatus includes a processor configured to assert an indicator that the processor is suspending execution of instructions until the processor receives an interrupt. In this embodiment, the apparatus includes power circuitry configured to alter the power provided to the processor based on the indicator. In this embodiment, the apparatus includes throttling circuitry configured to, in response to receiving a request from the power circuitry to alter the power provided to the processor, block the request until the end of a particular time interval subsequent to receipt of the request or de-assertion of the indicator. In some embodiments, the particular time interval corresponds to latency between the processor receiving an interrupt and de-asserting the indicator.

19 Claims, 5 Drawing Sheets

THROTTLING CIRCUITRY

BACKGROUND

Technical Field

This disclosure relates generally to computer processors and more specifically to circuitry for handling power control and interrupts.

Description of the Related Art

Some processor instruction set architectures (ISAs) specify a wait for interrupt (WFI) instruction. A WFI instruction may be thought of as a "hint" to the processor that there is no work that needs to be done at the current time. Thus, based on a WFI instruction, the processor may suspend execution of instructions until an interrupt or debug event occurs. The clock or power provided to the processor may be gated externally based on a WFI instruction, e.g., in order to further reduce power construction while the processor does not have work to do. However, unexpected results may occur if an interrupt is received in close proximity to power or a clock being removed from the processor based on a WFI instruction.

SUMMARY

Techniques are disclosed relating to processor power control and interrupts. In one embodiment, an apparatus includes a processor configured to assert an indicator that the processor is suspending execution of instructions until the processor receives an interrupt. In this embodiment, the apparatus includes power circuitry configured to alter the power provided to the processor based on the indicator. In this embodiment, the apparatus includes throttling circuitry configured to, in response to receiving a request from the power circuitry to alter the power provided to the processor, block the request until the end of a particular time interval subsequent to receipt of the request or de-assertion of the indicator. In some embodiments, the particular time interval corresponds to latency between the processor receiving an interrupt and de-asserting the indicator.

In one embodiment, the throttling circuitry is configured to deny the request in response to de-assertion of the indicator during the particular time interval. In one embodiment, the throttling circuitry is configured to grant the request in response to the indicator being asserted at the end of the particular time interval. In one embodiment, the throttling circuitry includes a counter and is configured to determine the particular time interval based on the counter. In various embodiments, the throttling circuitry may prevent a race condition between an alteration of power provided to a processor and an interrupt.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1:
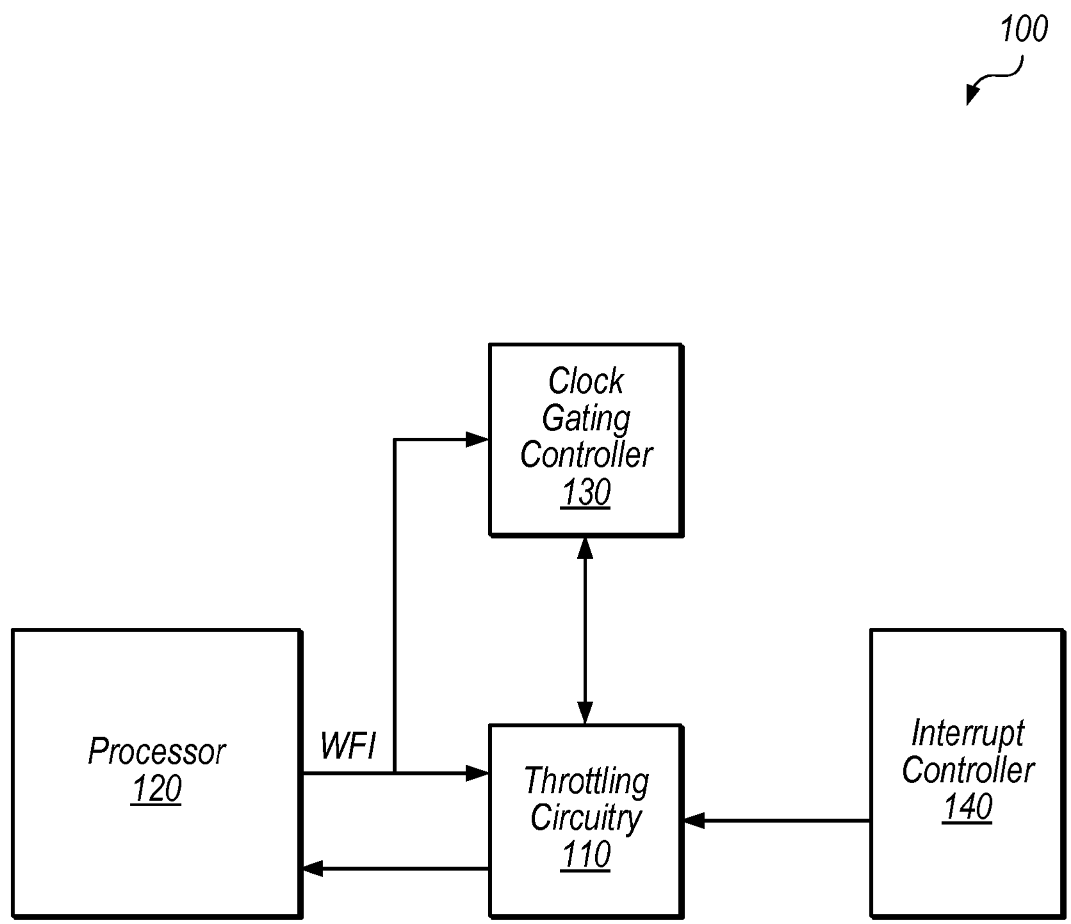
FIG. 1 is a block diagram illustrating one embodiment of a system that includes a processor and throttling circuitry.
Figure 2:
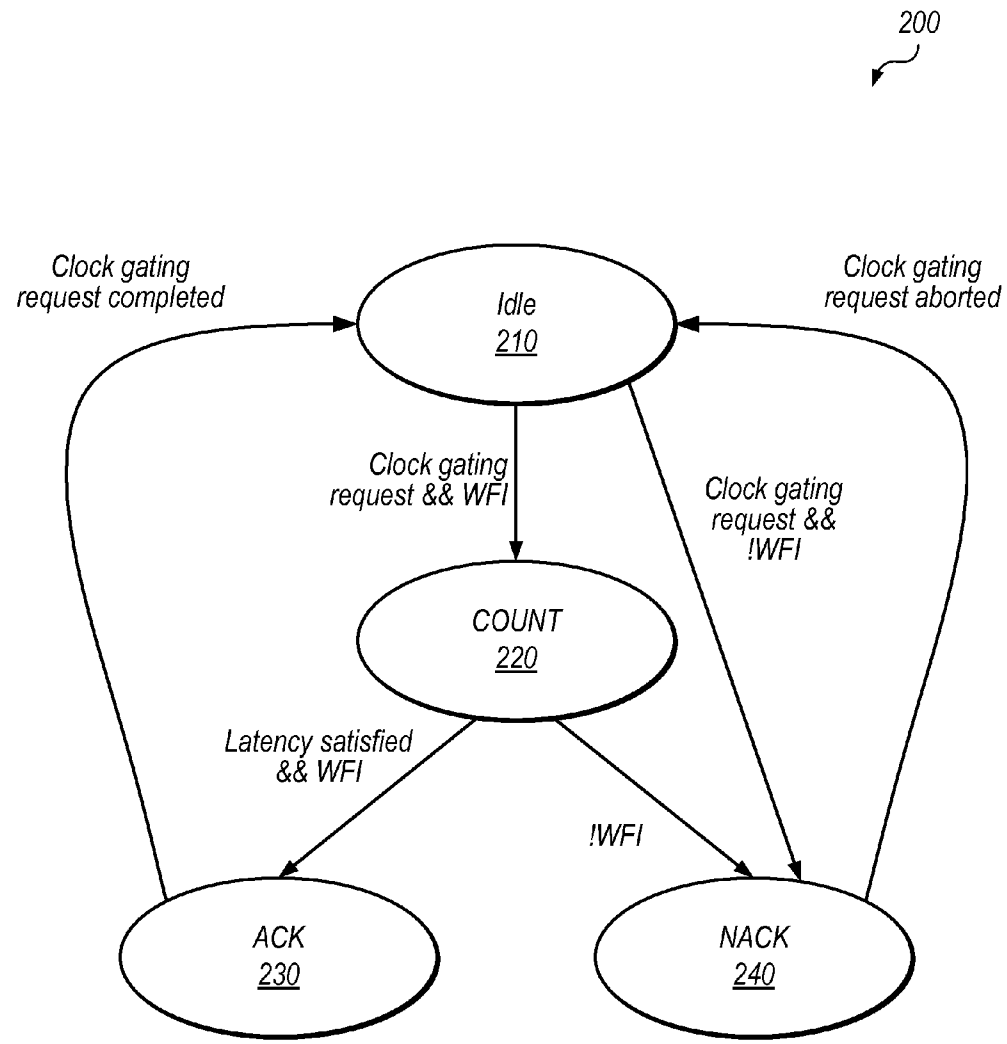
FIG. 2 is a diagram illustrating one embodiment of a state machine implemented by the throttling circuitry.
Figure 3:
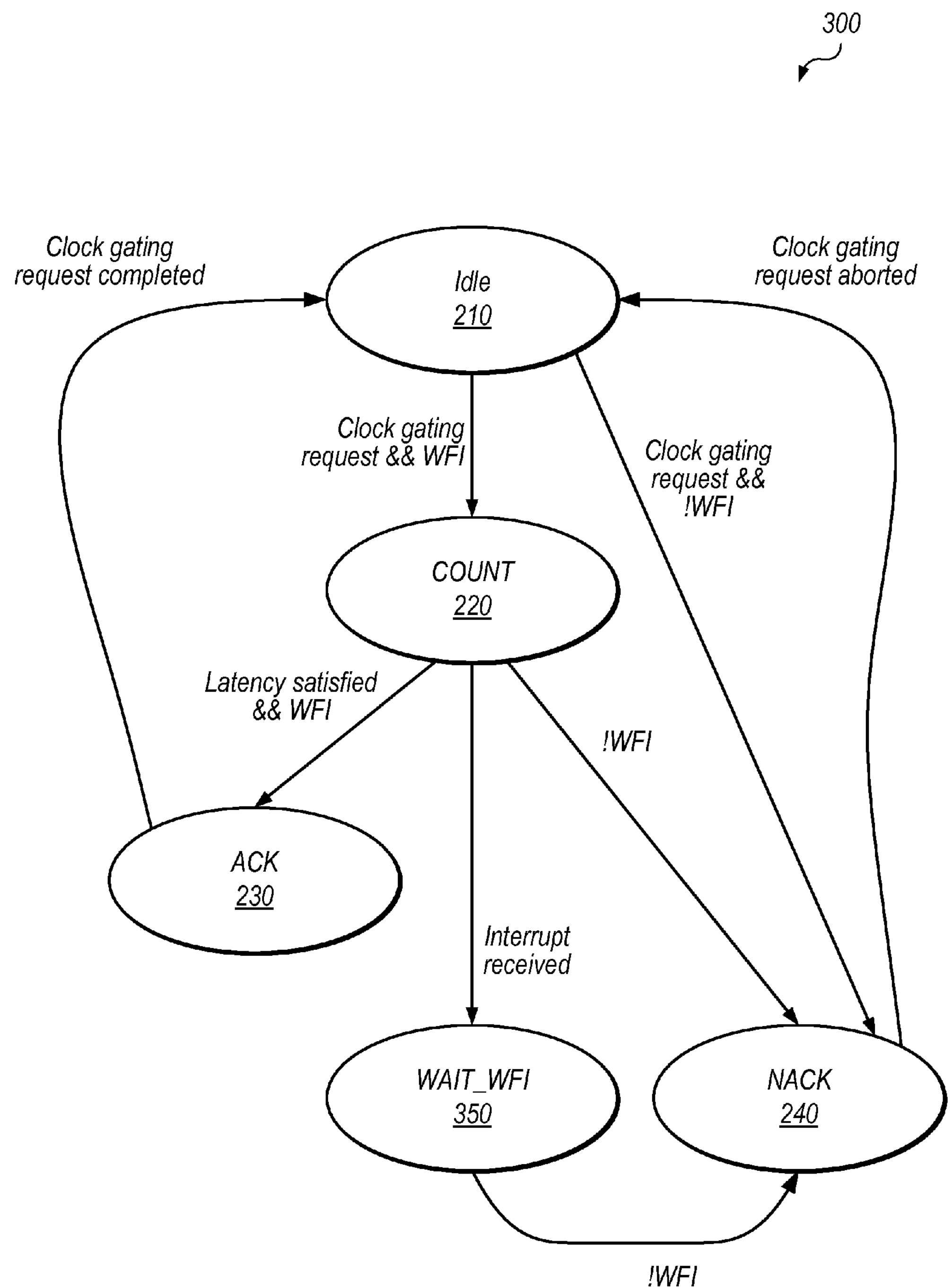
FIG. 3 is a diagram illustrating another embodiment of a state machine implemented by the throttling circuitry.

This disclosure initially describes, with reference to FIG. 1, an overview of wait for interrupt (WFI) functionality and one embodiment of throttling circuitry. FIG. 2 shows a state diagram implemented by one embodiment of the throttling circuitry while FIG. 3 shows a method implemented by one embodiment of the throttling circuitry. In various embodiments, the throttling circuitry may avoid race conditions between a power altering operation for the processor and an interrupt.

System Overview

FIG. 1 is a block diagram illustrating one embodiment of a system 100 that includes throttling circuitry. In the illustrated embodiment, system 100 includes throttling circuitry 110, processor 120, clock gating controller 130, and interrupt controller 140.

Processor 120, in the illustrated embodiment, is configured to execute instructions of a particular instruction set architecture. In the illustrated embodiment, processor 120 is configured to provide a wait for interrupt (WFI) indicator to clock gating controller 130 and throttling circuitry 110. In some embodiments, processor 120 is configured to assert the WFI indicator in response to executing a WFI instruction, which may be included in an operating system, a user application, etc. Processor 120 may include one or more caches for storing data and/or instructions from memory. Processor 120 may include one or more pipelines for executing program instructions, which may include pipeline stages such as fetch, decode, dispatch, execution, retire, etc. Processor 120 may be configured to execute program instructions out of program order in some embodiments. In various embodiments, processor 120 may implement any of various types of appropriate circuitry to facilitate execution of program instructions.

The term "WFI," as used herein, is not intended to narrow the scope of the present disclosure to any particular instruction or instruction set architecture, but instead refers to functionality that allows a processor to enter a state in which the processor suspends execution of instructions until the processor receives an interrupt. Various different types of processors may implement such a state.

Interrupt controller 140, in the illustrated embodiment, is configured to send interrupts to processor 120. Interrupts may be received by interrupt controller 140 from various sources including other processors, peripheral devices, etc. and routed to processor 120 as appropriate. In the illustrated embodiment, interrupt controller 140 is configured to send interrupts to processor 120 via throttling circuitry 110.

Clock gating controller 130, in the illustrated embodiment, includes circuitry configured to gate one or more clocks of processor 120. Clock gating controller 130 is described with reference to FIG. 1 for purposes of explanation. However, in other embodiments, power circuitry may be configured to perform various operations to alter the power provided to processor 120 in place of and/or in addition to clock gating. For example, in some embodiments, power circuitry may be configured to remove power from processor 120 or alter a power state of processor 120, in response to a WFI indicator. Thus, in the present disclosure, wherever embodiments relating to clock gating are described in a particular context, other embodiments may utilize power circuitry configured to perform various operations to alter the power provided to processor 120 in place of and/or in addition to clock gating, in the particular context.

WFI Overview

As mentioned above, processor 120 is configured to enter a WFI state, e.g., in response to a WFI instruction, in some embodiments. In one embodiment, processor 120 is configured to suspend executing instructions and assert a WFI signal when it is in the WFI state. The WFI signal may indicate that the processor can be clock gated, power can be removed, or processor 120 can otherwise be placed in a lower power state. In some embodiments, processor 120 is configured to exit the WFI state in response to receiving an interrupt. However, in the absence of throttling circuitry 110, there is potential for a race condition.

For example, consider the following sequence of events, in the absence of throttling circuitry 110:

1. Processor 120 enters WFI state
2. An interrupt arrives from interrupt controller 140
3. Clock gating controller 130 receives WFI notification and begins a clock gating process (before processor 120 has de-asserted WFI based on the interrupt)
4. Processor 120 begins executing instructions based on the interrupt
5. Clock gating controller 130 completes the clock gating process, causing processor 120 to lose its power or clock
6. Processor 120 attempts to execute instructions without a clock or power. This may cause processor 120 to hang, for example.

Accordingly, when a race condition exists between an interrupt and WFI functionality, unexpected results may occur.

Throttling Circuitry

Throttling circuitry 110, in the illustrated embodiment, is configured to block clock gating requests and/or interrupts to avoid race conditions. In the illustrated embodiment, throttling circuitry 110 is coupled to processor 120, but in other embodiments, it may be included in processor 120 or another processing element. In various embodiments, processor 120 may include any appropriate number of cores. In some embodiments, interrupts may be separately addressed to an individual core. In these embodiments, separate throttling circuitry may be included in, or coupled to, each processing core.

FIG. 2 shows a state diagram 200 implemented by throttling circuitry 110, in some embodiments. In the illustrated embodiment, state diagram 200 includes idle state 210, COUNT state 220, ACK state 230, and NACK state 240. In the illustrated embodiment, throttling circuitry 110 is configured to transition between states based on a clock gating request from clock gating controller 130, a WFI indication from processor 120, and a counter. In some embodiments (not shown), throttling circuitry 110 is also configured to transition between states based on receiving an interrupt.

In idle state 210, in some embodiments, throttling circuitry 110 is configured to allow interrupts (e.g., by not blocking interrupts and allowing them to proceed to processor 120). In these embodiments, throttling circuitry 110 is configured to remain in idle state 210 when the processor is executing instructions normally and is not in the process of being clock gated. In the illustrated embodiment, throttling circuitry 110 is configured to transition to COUNT state 220 in response to a clock gating request that is received when the WFI indicator is asserted (e.g., based on execution of a WFI instruction by processor 120). In the illustrated embodiment, throttling circuitry 110 is configured to transition to NACK state 240 in response to a clock gating request received when the WFI indicator is not asserted.

In COUNT state 220, in some embodiments, throttling circuitry 110 is configured to block interrupts, e.g., to prevent interrupts from waking processor 120 once clock gating has begun. In other embodiments (discussed in further detail below), throttling circuitry 110 is configured to abort the clock gating request based on interrupts received in COUNT state 220.

In the illustrated embodiment, throttling circuitry 110 is configured to start a counter when entering COUNT state 220. In this embodiment, the counter is configured to count a particular number of cycles corresponding to particular time interval. In some embodiments, the particular time interval corresponds to the latency between when processor 120 receives an interrupt and when processor 120 is configured to de-assert the WFI indicator in response to the interrupt, which may be a design parameter. This interval may ensure that any interrupts received prior to the clock gating request will not cause a race condition with the clock gating request, e.g., because such interrupts will cause the processor to de-assert WFI and allow throttling circuitry 110 to handle the clock gating request gracefully.

In the illustrated embodiment, throttling circuitry 110 is configured to transition to ACK state 230 from COUNT state 220 in response to the interrupt-to-WFI-change latency being satisfied (e.g., based on the counter reaching a particular value) and WFI remaining asserted at the end of the particular time interval (this may be the case when no interrupt has caused processor 120 to de-assert WFI, for example). In the illustrated embodiment, throttling circuitry 110 is configured to transition to NACK state 240 from COUNT state 220 in response to WFI being de-asserted, regardless of the counter value.

In ACK state 230, in some embodiments, throttling circuitry 110 is configured to block interrupts while allowing clock gating controller 130 to clock gate processor 120. In the illustrated embodiment, throttling circuitry 110 is configured to transition from ACK state 230 to idle state 210 in response to completion of the clock gating request.

In NACK state 240, in some embodiments, throttling circuitry 110 is configured to allow interrupts and deny the clock gating request. In the illustrated embodiment, throttling circuitry 110 is configured to transition from NACK state 240 to idle state 210 in response to the clock gating request being aborted.

In various embodiments, interrupt controller 140 is configured to send level-triggered interrupts to processor 120. Thus, to block an interrupt, throttling circuitry 110 may be configured to block a trigger line, then subsequently unblock the trigger line to allow the interrupt to proceed. In other embodiments, interrupt controller 140 is configured to send edge-triggered interrupts in addition to and/or in place of level-triggered interrupts. In these embodiments, throttling circuitry 110 may be configured to re-transmit a trigger (e.g., an edge) in order to allow a previously-blocked interrupt to proceed. In some embodiments, throttling circuitry 110 is configured to convert edge-triggered interrupts to level-triggered interrupts. Thus, in various embodiments, throttling circuitry 110 may be configured to handle various types of interrupts to avoid race conditions with clock gating controller 130.

FIG. 3 shows another state diagram 300 implemented by throttling circuitry 110, in some embodiments. In the illustrated embodiment, throttling circuitry 110 is configured to transition from COUNT state 220 to WAIT_WFI state 350 in response to receiving an interrupt in COUNT state 220. The other states in FIG. 3 may be configured as discussed above with reference to FIG. 2 for similarly numbered states.

In this embodiment, in WAIT_WFI state 350, throttling circuitry 110 is configured to allow interrupts to proceed to processor 120 and block the clock gating request. In these embodiments, once WFI is de-asserted (e.g., based on an interrupt arriving at processor 120), throttling circuitry 110 is configured to transition from WAIT_WFI state 350 to NACK state 240. In these embodiments, an interrupt received in COUNT state 220 will result in denial of the clock gating request, unlike the embodiment of FIG. 2 described above.

In this embodiment, WAIT_WFI state 350 may be included (e.g., rather than proceeding directly to NACK state 240 when an interrupt is received in COUNT state 220) because WFI de-assertion may be needed to complete a handshake with clock gating controller 130 for NACK state 240. In other embodiments, throttling circuitry 110 may be configured to transition directly to NACK state 240 from COUNT state 220 in response to receiving an interrupt in COUNT state 220.

Figure 4A:
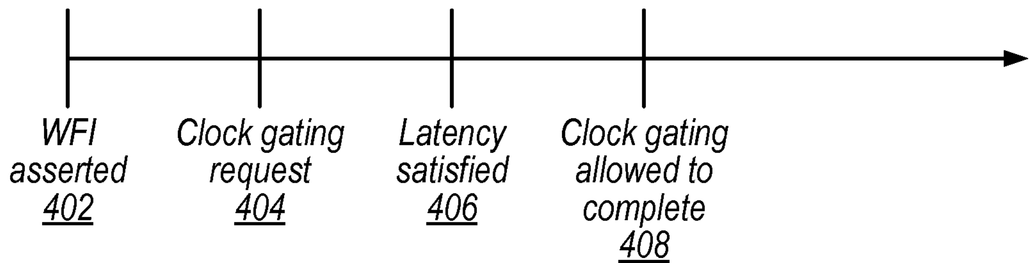
FIGS. 4A-4C are timing diagrams illustrating exemplary events handled by the throttling circuitry.
Figure 4B:
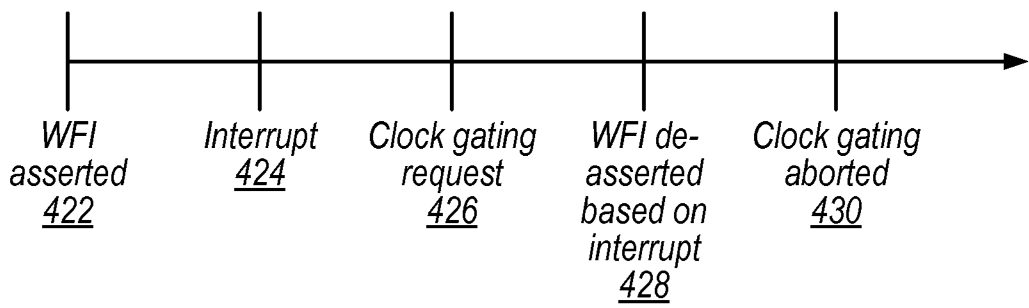
Figure 4C:
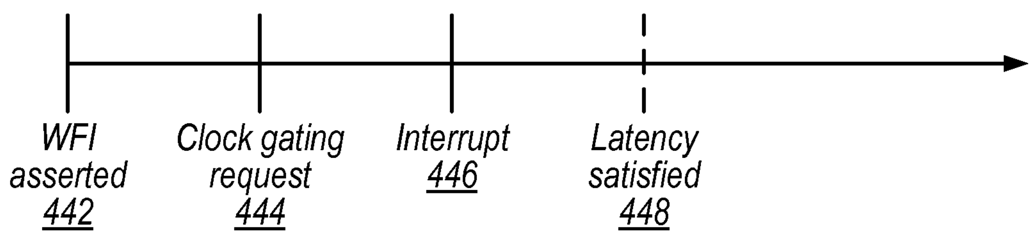

FIGS. 4A-4C show timing diagrams illustrating exemplary sequences of events handled by throttling circuitry 110 to avoid race conditions, according to some embodiments. In FIG. 4A, WFI is asserted as event 402. Subsequently, a clock gating request is received as event 404. In the embodiments of FIGS. 2-3, throttling circuitry 110 enters COUNT state 220 in response to event 404. Subsequently, the latency is satisfied as event 406 (this may be determined, for example, based on a counter). In the embodiments of FIGS. 2-3, throttling circuitry 110 enters ACK state 230 in response to event 406. Subsequently, the clock gating is allowed to complete as event 408.

In FIG. 4B, WFI is asserted as event 422. Subsequently, an interrupt is received as event 424. However, in this example, processor 120 does not de-assert WFI based on the interrupt until event 428. Prior to de-assertion of WFI, a clock gating requests is received as event 426. In the embodiments of FIGS. 2-3, throttling circuitry 110 enters COUNT state 220 in response to event 426. In the embodiments of FIGS. 2-3, throttling circuitry 110 enters NACK state 240 in response to WFI being de-asserted at event 428. Subsequently, the clock gating request is aborted as event 430. FIG. 4B illustrates a situation in which a race condition between the clock gating request and the interrupt is avoided by waiting to allow the clock gating request.

In FIG. 4C, WFI is asserted as event 442. Subsequently, a clock gating request is received as event 444. In the embodiment of FIGS. 2-3, throttling circuitry 110 enters COUNT state 220 in response to event 444. Subsequently, an interrupt is received as event 446. In some embodiments, including the embodiment of FIG. 3, throttling circuitry 110 is configured to abort the clock gating request based on event 446 (e.g., via WAIT_WFI state 350 and NACK state 240). In other embodiments, including the embodiment of FIG. 2, throttling circuitry 110 is configured to block the interrupt until the clock gating request is completed, then allow the interrupt to complete. In this embodiment, throttling circuitry 110 is configured to wait until the latency is satisfied at event 448 to avoid a race condition with any interrupts received prior to clock gating request 444. Event 448 is shown using a dashed line to indicate that the end of the latency period may not be determined (for example, in the embodiment of FIG. 3, throttling circuitry 110 is configured to transfer to WAIT_WFI state 350 in response to interrupt event 446 before the latency is satisfied, which may result in a counter reset). Thus, FIG. 4C, in conjunction with FIGS. 2-3, illustrates a situation in which a race condition between the clock gating request and the interrupt may be avoided in different ways.

Figure 5:
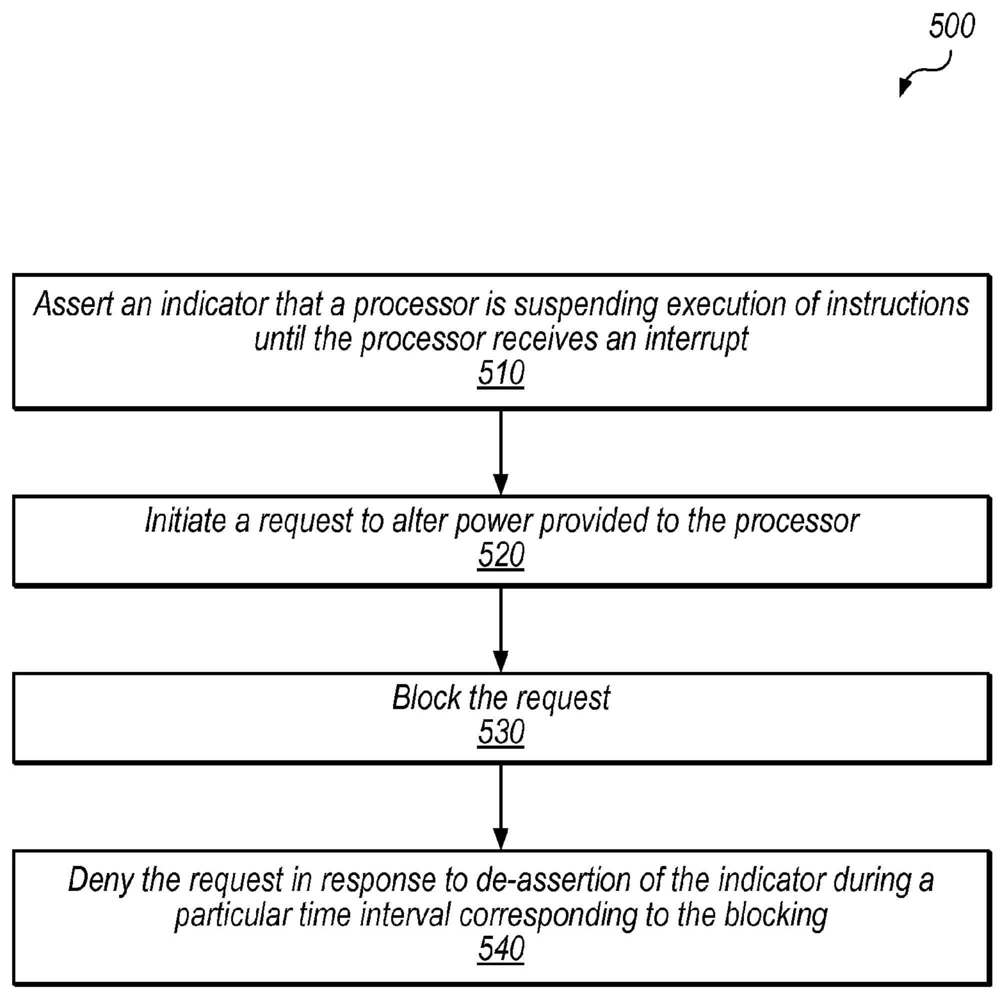
FIG. 5 is a flow diagram illustrating one embodiment of a method implemented by the throttling circuitry.

Referring now to FIG. 5, one embodiment of a method implemented by throttling circuitry is shown. The method shown in FIG. 5 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 510.

At block 510, an indicator is asserted, indicating that a processor is suspending execution of instructions until the processor receives an interrupt. For example, processor 120 may assert the WFI indicator. In some embodiments, the indicator signals to power circuitry (e.g., clock gating controller 130) that power provided to processor 120 may be altered. Flow proceeds to block 520.

At block 520, a request to alter power provided to the processor is initiated. In some embodiments, clock gating controller 130 is configured to transmit this request to throttling circuitry 110 in response to determining that the WFI indicator is asserted. Flow proceeds to block 530.

At block 530, the request is blocked. In some embodiments, throttling circuitry 110 is configured to block the request for a particular time interval subsequent to receipt of the request. The particular time interval may correspond to latency between processor 120 receiving an interrupt and de-asserting the WFI indicator. In some embodiments, throttling circuitry 110 is configured to wait in COUNT state 220 while blocking the interrupt. Flow proceeds to block 540.

At block 540, the request is denied in response to de-assertion of the indicator during a particular time interval corresponding to the blocking. In some embodiments, throttling circuitry is configured to reset a counter before the end of the particular time interval is reached in response to de-assertion of the indicator during the time interval. Flow ends at block 540.

In some embodiments, the request is granted in response to WFI remaining asserted at the end of the particular interval. In response to a granted request, clock gating controller 130 is configured to clock gate processor 120 until an interrupt is received and the indicator is de-asserted, in some embodiments. In some embodiments, the request is denied in response to one or more interrupts received during the particular interval.

Although specific embodiments have been described above, these embodiments are not intended to limit the scope of the present disclosure, even where only a single embodiment is described with respect to a particular feature.

Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:

a processor configured to assert a wait-for-interrupt indicator that indicates that the processor is suspending execution of instructions until the processor receives an interrupt;

power circuitry configured to alter power provided to the processor based on the indicator; and throttling circuitry configured to:

in response to receiving, while the indicator is asserted, a request from the power circuitry to alter power provided to the processor:

initiate a time interval beginning when the request is received by beginning to count a number of cycles using a counter;

block the request until:

the counter ends the time interval by matching a particular threshold, at which point the apparatus is configured to allow the request to proceed; or de-assertion of the indicator.

2. The apparatus of claim 1, wherein the time interval corresponds to latency between the processor receiving an interrupt and de-asserting the indicator.

3. The apparatus of claim 1, wherein the throttling circuitry is configured to deny the request in response to de-assertion of the indicator.

4. The apparatus of claim 1, wherein the throttling circuitry is configured to grant the request in response to the indicator being asserted at the end of the time interval.

5. The apparatus of claim 4, wherein the throttling circuitry is configured to block one or more interrupts until completion of the request.

6. The apparatus of claim 1, wherein the throttling circuitry is configured to deny the request based on receiving one or more interrupts during the time interval.

7. The apparatus of claim 1, further comprising an interrupt controller configured to route interrupts to the processor.

8. The apparatus of claim 1, wherein the power circuitry is configured to alter the power provided to the processor by performing at least one of: clock gating, removing power from at least a portion of the processor, or altering a power state of the processor.

9. The apparatus of claim 1, wherein the counter is configured to count the number of cycles of a clock signal.

10. A method, comprising:

asserting, by a processor, a wait-for-interrupt indicator that indicates that the processor is suspending execution of instructions until the processor receives an interrupt;

initiating, by power circuitry coupled to the processor, a request to alter power provided to the processor, in response to the indicator;

initiating, in response to receipt of the request while the indicator is asserted, a time interval beginning when the request is received by beginning to count a number of cycles using a counter;

blocking the request, by throttling circuitry coupled to the power circuitry during the time interval; and denying the request, by the throttling circuitry, in response to de-assertion of the indicator during the time interval.

11. The method of claim 10, further comprising:

blocking, by the throttling circuitry, a second request to alter the power provided to the processor for a particular time interval; and granting the second request, by the throttling circuitry, in response to the indicator remaining asserted at the end of the particular time interval.

12. The method of claim 11, further comprising:

the power circuitry altering the power provided to the processor in response the grant of the second requesting, wherein the altering comprises one or more of: clock gating, removing power from at least a portion of the processor, or altering a power state of the processor.

13. The method of claim 11, wherein the time interval corresponds to latency between processor receiving an interrupt and de-asserting the indicator.

14. The method of claim 10, further comprising:

the throttling circuitry blocking one or more interrupts while blocking the request.

15. An apparatus, comprising:

a processor configured to assert a wait for interrupt (WFI) indicator in response to executing a WFI instruction;

clock gating circuitry configured to gate one or more clocks for the processor based on the WFI indicator;

an interrupt controller configured to route interrupts to the processor; and throttling circuitry configured to:

receive a request from the clock gating circuitry to clock gate the one or more clocks, wherein the request is sent in response to assertion of the WFI indicator while the WFI indicator is asserted;

in response to the request, initiate a time interval beginning when the request is received by beginning to count a number of cycles using a counter; and block the request until:

the counter ends the time interval by matching a particular threshold at which point the apparatus is configured to allow the request to proceed; or de-assertion of the WFI indicator by the processor in response to an interrupt from the interrupt controller.

16. The apparatus of claim 15, wherein the throttling circuitry is configured to deny the request in response to de-assertion of the WFI indicator during the time interval.

17. The apparatus of claim 15, wherein the throttling circuitry is configured to grant the request in response to the WFI indicator remaining asserted at the end of the time interval.

18. The apparatus of claim 15, wherein the throttling circuitry is configured to block one or more interrupts received from the interrupt controller during the time interval.

19. The apparatus of claim 15, wherein the throttling circuitry is configured to deny the request in response to receiving an interrupt from the interrupt controller during the time interval.

* * * * *